Figure 1:
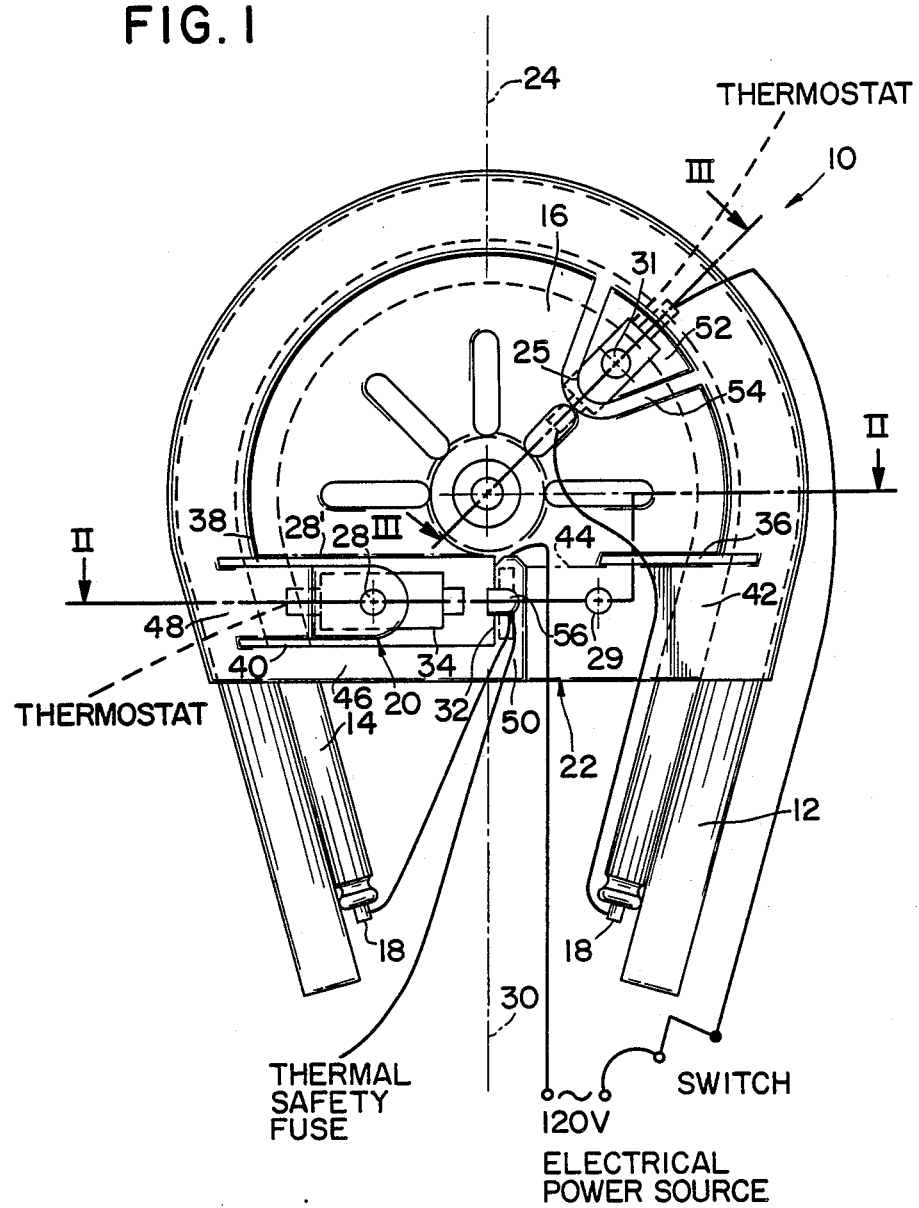

United States Patent [19]

Wonka

[11] Patent Number: 4,904,845
[45] Date of Patent: Feb. 27, 1990

[54] TEMPERATURE CONTROLLED ELECTRICAL CONTINUOUS FLOW HEATER FOR BEVERAGE MAKING APPLIANCES

[75] Inventor: Boris Wonka, Neu-Isenburg, Fed. Rep. of Germany

[73] Assignee: Braun Aktiengesellschaft, Kronberg, Fed. Rep. of Germany

[21] Appl. No.: 108,114

[22] Filed: Oct. 14, 1987

[30] Foreign Application Priority Data

Nov. 3, 1986 [DE] Fed. Rep. of Germany ....... 3637378

[51] Int. Cl.⁴ ................. H05B 1/02; A47J 31/00; F24H 1/14
[52] U.S. Cl. .................................... 219/283; 99/281; 99/288; 219/297; 219/301; 219/308; 219/328
[58] Field of Search ............... 219/280, 283, 301, 302, 219/303, 304, 305, 308, 328; 99/279, 280, 281, 282, 288, 306, 285, 302 R, 307

[56] References Cited

U.S. PATENT DOCUMENTS 3,711,681  1/1973  Leuschner et al. ................ 219/303
4,558,205  12/1985  Bleckmann ......................... 219/283

FOREIGN PATENT DOCUMENTS 149199  7/1985  European Pat. Off. ............ 219/283
170992  2/1986  European Pat. Off. ............ 219/283

Primary Examiner—Anthony Bartis
Attorney, Agent, or Firm—Fish & Richardson

[57] ABSTRACT

An electrical continuous flow water heater for an infusion beverage making appliance includes a hot plate serving to keep hot a beverage receptacle and which is located above and in heat exchange relationship with a heater element and water supply pipe disposed in a horse-shoe configuration. The temperature controller for controlling the temperature of the hot plate is mounted on one of a plurality of ribs provided on a support device thermally coupled to at least one of the supply pipe and heater element. Each rib is so sized and shaped and so located relative to the supply pipe and/or heater element to deliver solely through the rib a different amount of heat to a temperature controller mounted thereon. The temperature sensed by the controller is determined by the particularly rib on which the controller is mounted, thus permitting one type of continuous flow heater to keep hot flasks of different fill capacities place on the hot plate.

7 Claims, 2 Drawing Sheets

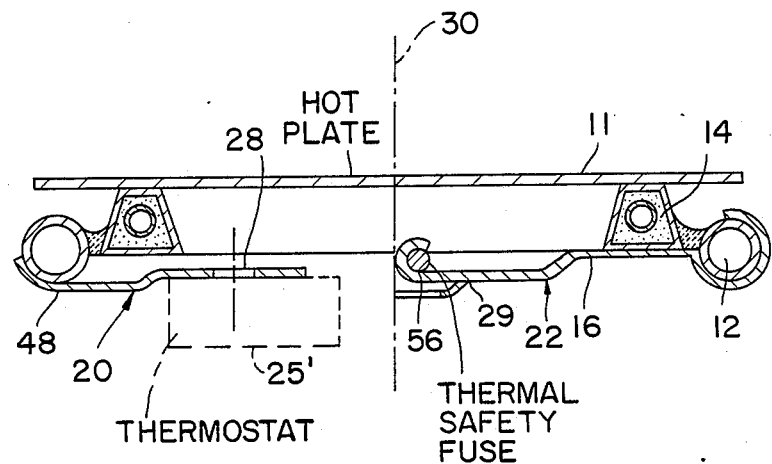
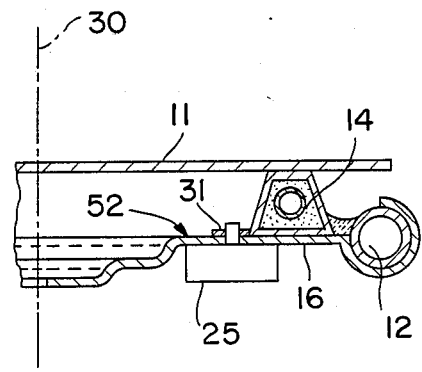

TEMPERATURE CONTROLLED ELECTRICAL CONTINUOUS FLOW HEATER FOR BEVERAGE MAKING APPLIANCES

The present invention relates to an electrical continuous flow heater for coffeemakers or similar household appliances for making infusion beverages. The continuous flow heater includes a heater element, a water supply pipe associate with the heater element, and a hot plate located above the heater element and water supply pipe that serves to store and to keep hot a receptacle to be filled with infusion beverages. A temperature controller for controlling the heater element is mounted on connector means provided for this purpose on a support device coupled to the continuous flow heater.

An electrical continuous flow heater for a coffee maker is known already (EP-A-No. 170 992) which is composed of a heater element and a parallel arranged water supply pipe which is equipped with a temperature control device. The temperature control device is placed on an assembly plate which is rigidly coupled to the heater element by means of ribs. After the brewing action has been terminated, the temperature control device will disconnect the heating at a predefined excess temperature. As soon as the heating drops below a specific temperature, it will be switched on again to keep the coffee hot. If, for instance, the coffee maker is to be furnished with a thermal flask, that means that the loss of heat which the coffee to be kept hot is subject to is less than when using a glass flask, a different continuous flow heater is required, to which also a different type of controller would have to be adapted if the coffee in the thermal flask is not to be overheated. This renders the manufacture of coffee makers costly, in particular they are to be equipped with a glass flask for one case and with a thermal or insulated flask for another case.

Compared thereto, it is the object of the present invention to improve upon the continuous flow heater such that solely one single type of continuous flow heater is sufficient even when having different flask designs with varying heat emission and different fill capacities.

This object is achieved by the instant invention in that the support device for accommodating the temperature controller is formed by at least two ribs whereat in each case a connector means is arranged for fastening only one temperature controller, and in that the ribs are designed such that the heat flow to the individual connector means is of different amount.

Owing to the advantageous design and arrangement of the ribs as support device for accommodating the temperature control device, the same type of temperature control device can be mounted on various connector means on the continuous flow heater even when differing temperature-preserving demands have to be met so that the continuous flow heater, on the one hand, can be used solely for the coffee maker with a glass flask and, on the other hand, for a coffee maker with a thermal flask. To this aim, the embodiment of the temperature control device which is used for the glass flask, too, is merely mounted on the corresponding connector means according to the instant invention. The distances between the various connector means and the heater and, respectively, the water supply pipe may be differently large. This permits reduction in the costs for warehousing the continuous flow heater and the temperature control device because the same continuous flow heater and the same temperature control device will manage to meet different temperature-preserving requirements.

In a favourable manner, likewise the ribs to accommodate the temperature control device may have different thermal capacities and can be dimensioned differently, in consequence whereof the heat flow between the heater element and the temperature control device can be influenced.

The self-supporting ribs to accommodate the temperature control device can extend inwardly in respect of the horse-shoe shaped continuous flow heater. However, it is also possible to have a rib extend up to the central axis of the continuous flow heater for the purpose of optimum temperature control, or to have the ribs fastened at a different location at the continuous flow heater, for example, inside or outside of the curvature of the water supply pipe. Furthermore, this invention allows to conceive that one rib interconnects the ends of the continuous flow heater on which there are designed two connector plugs for accommodating the temperature controller.

The present invention will be described in more detail hereinbelow by way of an embodiment illustrated schematically in the accompanying drawing in which:

FIG. 1 is a top plan view of a continuous flow heater in accordance with the invention; and FIGS. 2 and 3 are sectional views along the lines 2—2 and 3—3, respectively of FIG. 1.

In the drawing, reference numeral 10 designates a continuous flow heater which is preferably made of aluminum, which is composed of a horse-shoe shaped water supply pipe 12 and a parallel arranged heater element 14 which can e.g. be soldered to the water supply pipe 12. The ends 18 of the heater element 14 are connectible to a power supply via electrical cables not shown in the drawing. The water supply pipe 12 and the heater element 14, further, are mounted on a support plate 16 and are also soldered thereto or fastened thereto in any other way. The support plate 16 fills the interstice between the arcuate portion of the heater element 4. When viewing in the drawing, disposed beneath the support plate 16 are two ribs 20 and 22 which are partially cut out from the support plate 16, but which may also be rigidly connected endwise to the outside of the water supply pipe 12. As becomes further apparent from the drawing, the right and the left rib 22, 20 are coupled to the support plate 16, whereby they are provided with an additional support by the support plate 16 and thus ensure proper heat flow from the continuous flow heater to the temperature control device.

The support plate 16 forms the base plate of the continuous flow heater 10 on which the heater element 14 and/or the water supply pipe 12 are mounted. If only the heater element or the water supply pipe 12 is attached to the support plate 16, then the respective other part is welded to either the water supply pipe 12 or the heater element 14, respectively. In its mounted condition, the heater element 14 abuts on the bottom side of the hot plate 11 of the beverage maker (FIG. 2) so that the support plate 16 confines the water supply pipe 12 and the heater element 14 from below and the hot plate bounds them from above. The slots 36, 38, 40 which are formed when cutting out or punching out the ribs 22, 20 from the support plate 16 are sized in their length and width such as to allow through them only a predefined heat transmission at the connecting points 42, 44, 46 and 48 to the connector bores 28, 29.

The support plate 16 embraces but partly the water supply pipe 12. Rib 22 extends over the entire width of the continuous flow heater 10, and is offset by the side wall 32 at the height of the boss on the central axis 30. The free space 34 formed thereby serves to accommodate rib 20. When viewing in the drawing, the side wall 32 is succeeded on the right hand by a depression 50 on rib 22 which extends in longitudinal direction towards the central axis 30 and which serves to receive a non-illustrated safety fuse. The sheet-metal lug 56 retains the safety fuse in the depression 50. On the ribs 20, 22, the connector means 28 and 29, respectively, are constituted in the form of bores serving to secure the thermostatic controller 25.

In the arcuate portion on support plate 16, another rib 52 is punched out which is connected to the support plate 16 in the area of the water supply pipe 12 and which is encompassed by the slot 54. Said rib also contains a connecting bore 31 for accommodating a thermostat 25'.

As long as the water supply pipe 12 is penetrated by water, the temperature control device cannot reach any temperature higher than that of the water which amounts to roughly 100° C. That means, as long as water flows through the water supply pipe, the controller 25 is in the switch-on position. Only after e.g. the coffee-making action has been terminated and no more water flow through the water supply pipe will the heat flow from the heater element 14 and the water supply pipe 12 via rib 20, 22 or 52 to the temperature controller 25 rise so that the latter control device will switch off the heater element 14 after a predefined degree of heating is attained and will switch it on again after cooling down to a predetermined temperature.

The shorter rib 20 serves for instance to accommodate a temperature control device in which a lower preserving temperature is desired such as e.g. requested by insulated flasks. In contrast thereto, rib 22 serves to accommodate the temperature control device if a higher preserving temperature is required and/or more heat must be supplied in order to compensate for energy losses of the flask. In this respect, it is likewise important for the control, whether the rib 20 or 22 or 52, respectively, is located closer to the water inlet or to the water outlet of the water supply pipe 12, since the temperature of the water is higher at the outlet than at the water inlet.

That means, the described continuous flow heater 10 is designed to meet different temperature-preserving requirements, while the other parameters such as heating power, size of the continuous flow heater 10 etc. can be maintained. The different switch-on temperature for the temperature control device can thus be influenced in a simple manner by respectively positioning the temperature control device 25 on the various ribs 20, 22 or 52. This permits to create different conditions by virtue of two equal units (controller and continuous flow heater), and, alternatively, the temperature control device is mounted either on a short rib 20 or 52 or on a longer rib 22 of the continuous flow heater 10. The costs for warehousing of the temperature control device and the continuous flow heater 10 can be minimized thereby, since the same component parts lend themselves to being used for various types of continuous flow heaters.

The diametrally oppositely arranged ribs 20 and 22 shown in the drawing can also be mounted on a different place on the water supply pipe 12 and/or the heating 14. Thus, it is possible for instance to provide the one rib 20 in the semicircle at the inner side of the water supply pipe 12, as is displayed by rib 52, for example. Yet, it is also possible to mount a rib externally, that means on the outer side of the water supply pipe 12.

However, it is not always imperatively needed to use a support plate 16. In the absence of a support plate 16, the ribs 20, 22, 52 may also be secured to the water supply pipe 12 or the heating 14. It is also permitted though to make the rib by two sheet-metal lugs, one of which extends from the heater supply pipe 12 and the other one from the heater 14, their two free ends being united. This affords to improve the bending resistance as well as the heat absorption and the heat flow of the rib, respectively.

I claim:

1. An electrical continuous flow heater for coffee makers or similar household appliances for making infusion beverages, comprising a heater element, a water supply pipe assigned thereto, a hot plate located above the heater element and water supply pipe in heat exchange relation therewith and which serves to store and to keep hot a receptacle to be filled with infusion beverages, and comprising a temperature controller destined to control the temperature of the heater element, the said temperature controller being mounted on a connector means provided for this purpose on a support device coupled to at least one of said supply pipe and heater element, characterized in that the support device for accommodating the temperature controller includes at least two ribs (20, 22, 52) whereat in each case a connector means (28, 29, 31) is arranged for fastening only one temperature controller, and in that each rib (20, 22, 52) is sized and shaped and located relative to said heater element and supply pipe to deliver a different amount of heat and that the heat flow from said supply pipe and said heater element is delivered to said temperature controller solely through said rib on which said temperature controller is mounted, whereby the temperature sensed by said temperature controller is determined by the particular rib on which said temperature controller is mounted.

2. A continuous flow heater as claimed in claim 1, characterized in that the distances between the various connector plugs means (28, 29, 31) and at least one of the heater element (14) and the water supply pipe (12) are different.

3. A continuous flow heater as claimed in claim 1, characterized in that each of said ribs (20, 22, 52) has a different heat capacity.

4. A continuous flow heater as claimed in claim 2, characterized in that each of said ribs (20, 22, 52) is dimensioned differently.

5. A continuous flow heater as claimed in claim 1, characterized in that said water supply pipe is of horseshoe shape and defines an inner space and individual ribs (20, 52) are connected in a self-supporting fashion on at least one of the water supply pipe (12) and the heater element (14) and extend therefrom (28, 31) towards the inner space formed by the water supply pipe 12.

6. A continuous flow heater as claimed in any one of claims 1–5, characterized in that said water supply pipe and said heater element are each of horseshoe shape configuration and include straight end portions connected by a curved portion, said water supply pipe and said heater element being in parallel arrangement, and one connector means (31) for connecting the temperature control device is arranged in the inner area defined by said curved portions of the heater element (14) and the water supply pipe (12), respectively, while another connector means (28 and/or 29) is arranged outside of the inner area defined by said curved portions of the heater element (14) and the water supply pipe (12), respectively.

7. A continuous flow heater as claimed in any one of claims 1-5, characterized in that said continuous flow heater has a central axis (24), and at least one rib (22) extends up to said central axis (24).

* * * * *